United States Statutory Invention Registration [19]

[11] Reg. Number: H909

Danby et al. [43] Published: Apr. 2, 1991

[54] METHOD OF CORRECTING EDDY CURRENT MAGNETIC FIELDS IN PARTICLE ACCELERATOR VACUUM CHAMBERS

[75] Inventors: Gordon T. Danby, Wading River; John W. Jackson, Shoreham, both of N.Y.

[73] Assignee: The United States of America as represented by the United States Department of Energy, Washington, D.C.

[21] Appl. No.: 505,289

[22] Filed: Mar. 19, 1990

[51] Int. Cl.[5] ..... H01J 23/34; H01J 29/06

[52] U.S. Cl. ..... 328/233; 315/8; 315/85

[58] Field of Search ..... 328/235, 233; 315/8, 315/85

[56] References Cited

U.S. PATENT DOCUMENTS

| | | | |
|---|---|---|---|
| 3,911,321 | 10/1975 | Wardly | 315/364 |
| 4,362,632 | 12/1982 | Jacob | 422/183 |
| 4,395,691 | 7/1983 | Knauer | 335/210 |
| 4,701,623 | 10/1987 | Beasley | 250/492 |

OTHER PUBLICATIONS

"Vacuum System for the NAL Booster Synchrontron" by E. L. Hubbard et al., 1971 Particle Accelerator Conference, Accelerating Engineering and Technology, Chicago, Ill., U.S.A., (Mar. 1-3 1971), pp. 654, 655.

"Bending Magnets of the NAL Main Accelerator", by Hinterberger et al., 1971 Particle Accelerator Conference, Accelerator Engineering and Technology, Chicago, Ill., U.S.A., (Mar. 1-3 1971), pp. 853-856.

"Pole Face Winding (PFW) Equipment for Eddy Current Correction at the Zero Gradient Synchrotron (ZGS)", by D. E. Suddeth et al., Conference IEEE Trans. Nucl. Sci. (U.S.A.), vol. NS-20, No. 3, Jun. 1973, pp. 397, 398.

*Primary Examiner*—Linda J. Wallace

*Attorney, Agent, or Firm*—Vale P. Myles; Thomas G. Anderson; William R. Moser

[57] ABSTRACT

A method for correcting magnetic field aberrations produced by eddy currents induced in a particle accelerator vacuum chamber housing is provided wherein correction windings are attached to selected positions on the housing and the windings are energized by transformer action from secondary coils, which coils are inductively coupled to the poles of electro-magnets that are powered to confine the charged particle beam within a desired orbit as the charged particles are accelerated through the vacuum chamber by a particle-driving rf field. The power inductively coupled to the secondary coils varies as a function of variations in the power supplied by the particle-accelerating rf field to a beam of particles accelerated through the vacuum chamber, so the current in the energized correction coils is effective to cancel eddy current flux fields that would otherwise be induced in the vacuum chamber by power variations in the particle beam.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF CORRECTING EDDY CURRENT MAGNETIC FIELDS IN PARTICLE ACCELERATOR VACUUM CHAMBERS

This invention was made with Government support under contract number DE-AC02-76CH00016, between the U.S. Department of Energy and Associated Universities, Inc. The Government has certain rights in the invention.

BACKGROUND OF THE INVENTION

It is generally well known that undesirable eddy currents are induced in vacuum chambers that are used in particle beam accelerators. In such accelerators electromagnets are positioned in operating relationship to a plurality of vacuum chambers through which charged particles are accelerated by an rf flux while being contained within a desired orbit by the flux fields produced by such positioning magnets. For those accelerators in which the magnetic fields of the particle beam-positioning magnets are rapidly cycled, it has been found that currents which are induced in the vacuum chambers as a consequence of such rapid cycling are a major source of both systematic and random aberrations in the magnetic fields of the particle beam accelerator lattice. It is possible to diminish the undesirable affect of such induced eddy currents by making the vacuum chamber walls relatively thin, but such thin walls are typically complex in structure and both expensive and delicate to handle. Such handling is extensive in applications where the vacuum chambers must undergo periodic vacuum-enhancing bakeouts. On the other hand, thick walled vacuum chambers for particle accelerator beams are desirably rugged and economical to construct and operate, but they have undesirably large eddy currents induced in them as a consequence of the particle beam-positioning magnets being rapidly cycled. In addition to the effects of different vacuum chamber walls thicknesses on the size of eddy currents induced in the chamber walls, it is known that random eddy current fields are also induced in such vacuum chamber walls due to variations in both geometrical and material tolerances, and due to variations in conductivity of the walls. In general, it has been found that such variations in the construction of vacuum chambers for particle accelerators dominate the induced aberrations in magnetic flux fields of typical rapid cycling particle accelerator lattices.

OBJECTS OF THE INVENTION

A primary object of the present invention is to provide a method for correcting undesired magnetic fields that are produced by eddy currents induced in vacuum chamber walls of a charged particle accelerator lattice.

Another object of the invention is to provide a system of self-correction coils mounted adjacent to the walls of a particle accelerator vacuum chamber, and to provide the system with a source of electric power that is operable to cause the self-correction coils to automatically correct undesired magnetic fields induced in the walls of the vacuum chamber by rapid cycling of the magnetic fields in the beam-positioning magnets associated with the vacuum chamber.

Yet another object of the invention is to provide a simple passive system that is operable to automatically adjust for large variations in the particle-accelerating magnet fields applied to a vacuum chamber, whereby coils coupled by transformer action to that field are connected to effectively energize correction windings mounted on the vacuum chamber, thereby to cause the correction windings to substantially eliminate undesired magnetic fields produced by eddy currents induced in the walls of the vacuum chamber.

Additional objects and advantages of the invention will become apparent from the description of it contained herein.

SUMMARY OF THE INVENTION

In a preferred arrangement of the method of the invention correction coils are mounted on the outer surfaces of a particle accelerator vacuum chamber and those coils are series connected with secondary coils which are energized by transformer action by variations in the accelerator magnetic field used to position or confine particles in their orbits through the vacuum chamber. Means are provided for adjusting the current in the series circuit in order to cause the current induced in the secondary coils to substantially correct undesired magnetic fields that are produced by eddy currents induced in the walls of the vacuum chamber when the particle accelerating magnets are rapidly cycled.

SUMMARY OF THE INVENTION

In a preferred arrangement of the method of the invention for correcting undesired magnetic field aberrations that are produced by eddy currents induced in a metallic vacuum chamber, a plurality of correction windings are mounted at pre-determined locations on the outer surface of the vacuum chamber. The correction windings are connected in a series circuit with secondary coils that are energized by transformer action resulting from their coupling with one of the particle beam-positioning magnets associated with the vacuum chamber. A conventional rf field is applied to accelerate charged particles through the vacuum chamber. The resultant electric power in the secondary coils is made to vary in proportion to the accelerating flux applied to the particle beam passing through the vacuum chamber. A variable resistor is mounted in the series circuit for adjusting the current that flows in the correction windings, thereby to provide convenient means for making an adjustment that effectively cancels undesirable eddy current fields that would otherwise be induced in the vacuum chamber by the charged particles that are accelerated through the chamber by the applied rf field and that are maintained within a desired orbit by associated particle beam-positioning magnets.

DESCRIPTION OF THE PREFERRED EMBODIMENT

The present invention is useful for correcting vacuum chamber eddy current field aberrations in a variety of vacuum chambers, but it is particularly useful for making such corrections in relatively thick-walled metallic vacuum chambers that are used in fast-cycled particle accelerator applications. One such fast-cycled accelerator application is that used to produce high intensity proton acceleration in the Alternating Gradient Synchrotron (AGS) Booster accelerator that will soon be in operation at Brookhaven National Laboratory, Upton, N.Y. Accordingly, the preferred embodiment of the invention will be described with reference to a suitable vacuum chamber for the AGS Booster. In that application rapid cycling occurs at about 7.5 hertz (Hz) with variable magnetic flux excitation, $B=dB/dt=1.4$ Tesla/second at injection, which increases to B equal to approximately 10 T/sec about 30 milliseconds later.

Figure 1:
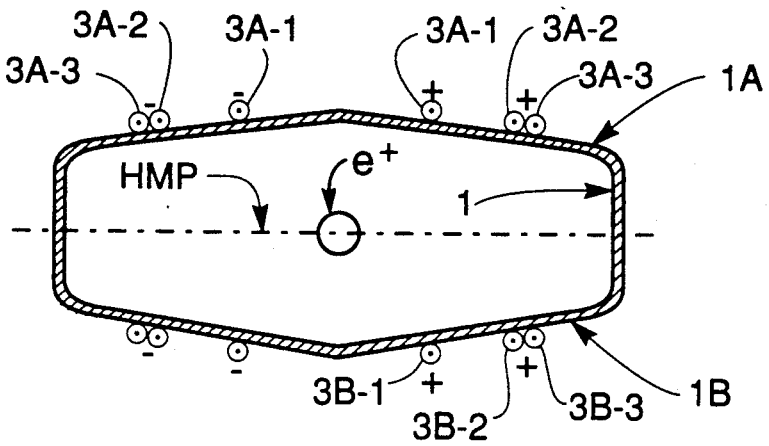
FIG. 1 is a schematic side plan view, in cross-section along the vertical central axis of a vacuum chamber on which three correction coils are mounted on its top surface, and another three correction coils are mounted on the bottom surface thereof, to provide a reduction in eddy-current-induced aberrations in the magnetic flux generated within the chamber by associated particle beam-positioning magnets, according to the method of the present invention.

FIG. 1 illustrates a vacuum chamber 1 that has a generally curved top wall 1A and a generally curved bottom wall 1B. Such vacuum chambers are typically fabricated of aluminum or stainless steel metal, but in the preferred embodiment the metal of the walls of the vacuum chamber is INCONEL metal. With respect to the features of the present invention, the significance of the particular metals selected for fabricating the vacuum chamber is that the vacuum chamber walls are electrically conductive, thus, eddy current fields are generated in the walls proportional to their nominal thickness or current carrying properties. The nominal thickness of the INCONEL metal vacuum chamber walls used in the preferred embodiment of the vacuum chamber 1 are in the range of 0.1 to 0.3 cms. Of course, in alternative applications the vacuum chamber walls may be made substantially thinner, provided that adequate external supporting structures can be positioned adjacent to the walls in such applications, or provided that corrugated thin wall configurations can be used to strengthen such vacuum chambers. Due to the fact that such supporting structures or corregated wall arrangements are relatively complex as well as being costly to fabricate and often difficult to use because of the extra space that they require, the thick walled vacuum chamber embodiment is preferrred for the AGS Booster application described here. Moreover, such thick walls are more advantageously resistant to corrosion that can result from the very high charged particle beam intensity used in this Booster application.

Figure 2:
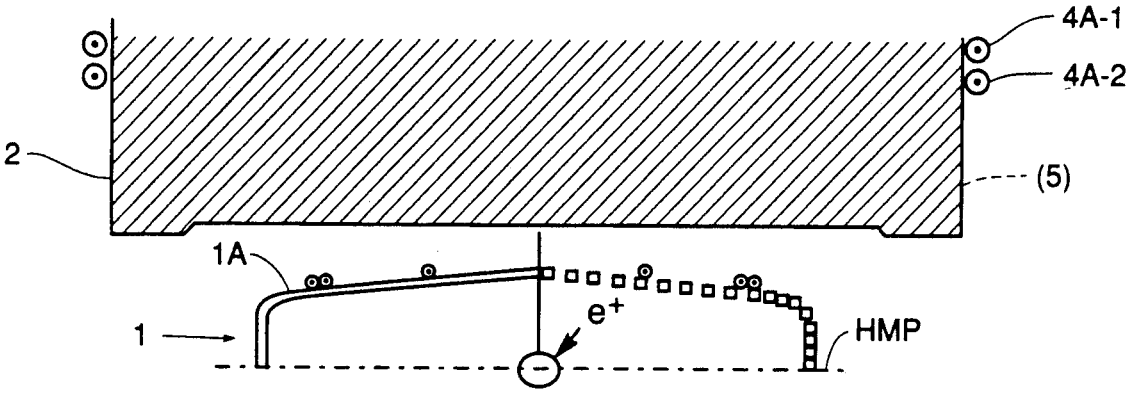
FIG. 2 is a schematic side plan view, in cross section along the vertical central axis of the left upper quadrant of a vacuum chamber such as that shown in FIG. 1, wherein a particle beam-positioning electro-magnet pole is shown positioned in operating relationship above the vacuum chamber, and wherein a large number of hypothetical electric current elements, each illustrated by a small square, are arranged to define a pattern corresponding to the shape of the upper right quadrant of the vacuum chamber. The squares are used for a computer simulation of the current carrying surface of the vacuum chamber, thereby to facilitate a determination of optimum positions for mounting correction windings on the upper surface of the vacuum chamber, according to the method of the invention.

In the preferred embodiment, it should be understood that the vacuum chamber 1 is a state of the art machine which includes fully distributed chromacicity sextupoles (not shown herein) in the accelerator lattice, which sextupoles are made of adequate strength to correct, at least in a first order, for the average dipole-induced vacuum chamber eddy current sextupoles. As illustrated in FIG. 2, there is positioned adjacent to the vacuum chamber 1 a magnetic pole 2 of a dipole magnet particle beam-positioning arrangement for bending charged particles, such as protons, through the vacuum chamber 1 to maintain the particle beam within a desired orbit or path. The illustrated electro-magnetic pole 2 is positioned adjacent to the upper surface 1A of the vacuum chamber, and it should be understood that another pole (not shown) of the dipole beam-positioning arrangement would be similarly positioned adjacent to the lower surface 1B (in FIG. 1) of the vacuum chamber. In the operation of the vacuum chamber, a beam of charged particles, such as protons, schematically and generically illustrated by the circle designated $e^+$in FIGS. 1 and 2, moves from an entrance aperture to an exit aperture of the vacuum chamber 1 essentially in a beam vertical to the plane of the paper.

Typically the vacuum chamber 1 is made to be between one and three meters in length, measured parallel to the accelerated beam of charged particles $e^+$, and is made approximately 10 to 20 cms in width between its side walls. In the preferred embodiment chamber 1 is made about 5 to 10 cm in height between the apices of the top wall 1*a* and the bottom wall 1*b*, as illustrated in FIG. 1. Conventional machining and welding techniques can be used for fabricating the vacuum chamber 1.

In order to fit the vacuum chamber 1 inside of the 10° dipole magnet (2 and its counterpart), the top surface 1A and bottom surface 1B of the vacuum chamber are preferably curved about as illustrated in FIG. 1. Conventional high vacuum fabrication techniques are used to manufacture the vacuum chamber for its intended use in the desired heavy ion accelerating application. Such techniques require that the vacuum chamber 1 be baked-out using electrical heaters. This necessary accommodation to baked-out, combined with the necessary space-saving curvature of the walls of the vacuum chamber 1, make it more difficult to control the relative location of the vacuum chamber walls in relation to the beam of accelerated charged particles e+ during operation of the accelerator system. In addition to that problem of relative location, it is known that substantial random current fields will occur in the walls of the vacuum chamber 1 during its accelerator operation, due to variations in both the geometry of the fabricated walls and the constituent material tolerances, as well as due to variations in wall thickness and electrical conductivity. These variables are particularly significant when it is recognized that the eddy current induced non-linear fields in the vacuum chamber walls are larger than errors or aberrations in the particle accelerating magnetic field from other sources in the lattice of the booster accelerator. Accordingly, such induced errors from the vacuum chamber 1 dominate all other sources of errors of the magnetic field flux, B, in the accelerator lattice. The method of the present invention corrects or eliminates such undesirable aberrations in the particle-accelerating field.

Such undesirable magnetic field variations are corrected with the method of the invention by attaching correction windings, such as the three coils of correction windings 3A-1, 3A-2 and 3A-3 that are attached to the outside upper surface 1A of the vacuum chamber 1, at predetermined locations thereon, as illustrated in FIG. 1. Any conventional means may be used to attached the correction windings 3A-1 through 3A-3 to the upper surface 1A of the vacuum chamber. In the preferred embodiment, the correction windings are fabricated of conventional inexpensive copper wire that is sheathed in ceramic and mounted inside of a stainless steel tube. An example of such a commercially available sheath and insulated copper conductor can be found in the heating coils used for tea-cup water heaters. In the preferred embodiment, the stainless steel tubes of the correction windings 3A-1 through 3A-3 are spot welded to the end metal of the vacuum chamber 1, at selected spaced points along the tubes. As noted above, the purpose of the correction windings is to correct or substantially cancel or eliminate the large sextupole, and higher order, harmonic magnetic fields that would otherwise be produced by eddy currents induced in the walls of the vacuum chamber 1 over the entire length of the desired good driving field for the accelerated beam (e+) in the vacuum chamber 1. It should be understood that such correction windings are not needed to correct the vacuum chamber eddy current sextupoles, because the conventional fully-distributed chromimatic correcting sextupoles that are provided in the AGS Booster (not illustrated herein) have sufficient strength to make such corrections.

Two important advantages of the method of the invention, which uses correction windings (3A-1, 3A-2 and 3A-3) directly attached to predetermined locations on the outer surfaces of the vacuum chamber 1, are: (1) variations in the positional tolerances of the walls of the vacuum chamber are no longer of great importance because the eddy current cancelling fields produced by the correction windings automatically have the same displaced coordinates as the coordinates of the vacuum chamber walls to which they are attached and (2) the correction windings eliminate non-linearity in the accelerating magnetic flux at its source and so are optically superior to other flux aberration correction methods. A further advantage, as is described more fully below, is that the correction windings 3A-1 through 3A-3 are preferably energized by transformer action from the associated particle accelerator magnets. Consequently, that transformer action provides a simple passive energizing system that automatically adjusts for large variations in the accelerator magnetic flux B.

To practice the method of the invention in the preferred embodiment application being described, it should be understood that a second set of correction windings 3B-1, 3B-2 and 3B-3 is suitably attached to the bottom outer surface 1B of the vacuum chamber 1, as shown in FIG. 1. According to the method of the invention, secondary coils are provided for supplying electric power to the correction windings. In the preferred embodiment, correction coils 4A-1 and 4A-2 are wrapped around the back leg of particle beam-positioning dipole magnet 2, as shown in FIG. 2. It should be understood that a similar pair of secondary coils 5B-1 and 5B-2 (not shown, but illustrated schematically by the coil 5B in FIG. 3), are wound on the back leg of the other dipole beam-positioning magnet (not shown but referred to in phantom in FIG. 2 by the dashed line from (5) to the counterpart upper pole 2 of the set of dipoles) that is mounted adjacent to the bottom surface 1*b* of the vacuum chamber.

Figure 3:
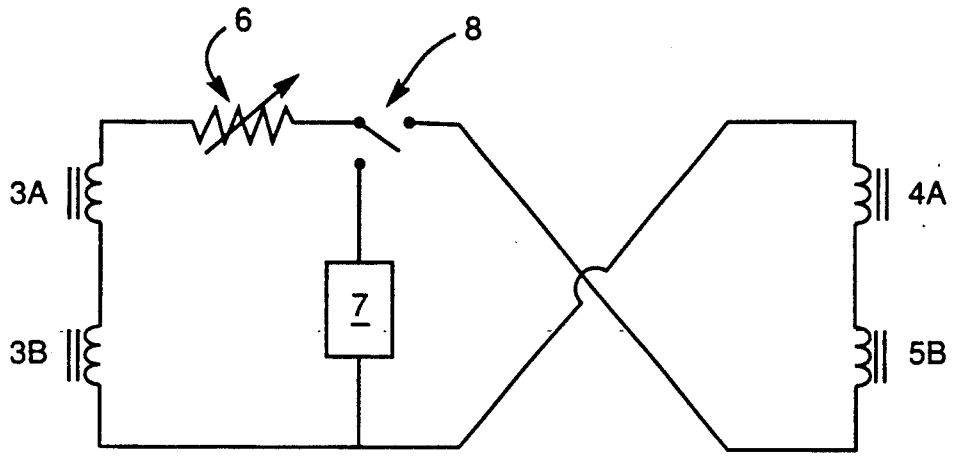
FIG. 3 is a schematic circuit diagram of an eddy current self-correction circuit that is used, according to the method of the present invention, to energize the correction windings illustrated in FIGS. 1 and 2. The circuit utilizes transformer action resulting from positioning the secondary coils of the circuit in inductive relationship with one of the charged particle beam-positioning magnets associated with the vacuum chamber.

Referring to FIG. 3, which is a schematic circuit diagram of the self-correction winding and secondary energizing coil arrangement for practicing the preferred embodiment of the invention, it is seen that the secondary coils 4A-1, 4A-2 are designated as the coil 4A for use with the type of vacuum chamber to be used in the preferred embodiment. The secondary coils 4A and 5B are electrically connected in series with the correction winding 3A and 3B and with variable resistor 6 in a series circuit, as shown. There is also illustrated in FIG. 3 a suitable conventional power supply 7 and associated two pole switch 8 that is operable to either supply electric power by transformer action from the secondary coils 4A and 5B to the correction windings 3A and 3B, as a function of a predetermined dB/dt magnetic field applied to a beam of charged particles (e+) that is accelerated through the vacuum chamber 1 during normal particle-accelerating operation of the systems, or to supply power to the correction windings from the power supply 7. Accordingly, when switch 8 connects windings 3A and 3B to the secondary coils 4A and 5B, electric voltages proportional to dB/dt induced in the back leg windings 4A and 5B vary the electric current supplied by the secondary coils 4A and 5B in series with the correction windings 3A and 3B to correct for the vacuum chamber eddy current fields. Alternatively, if the switch 8 is thrown to its other position, the power supply 7 and series circuit supply power to the correction windings 3A and 3B according to any desired program.

Figure 4:
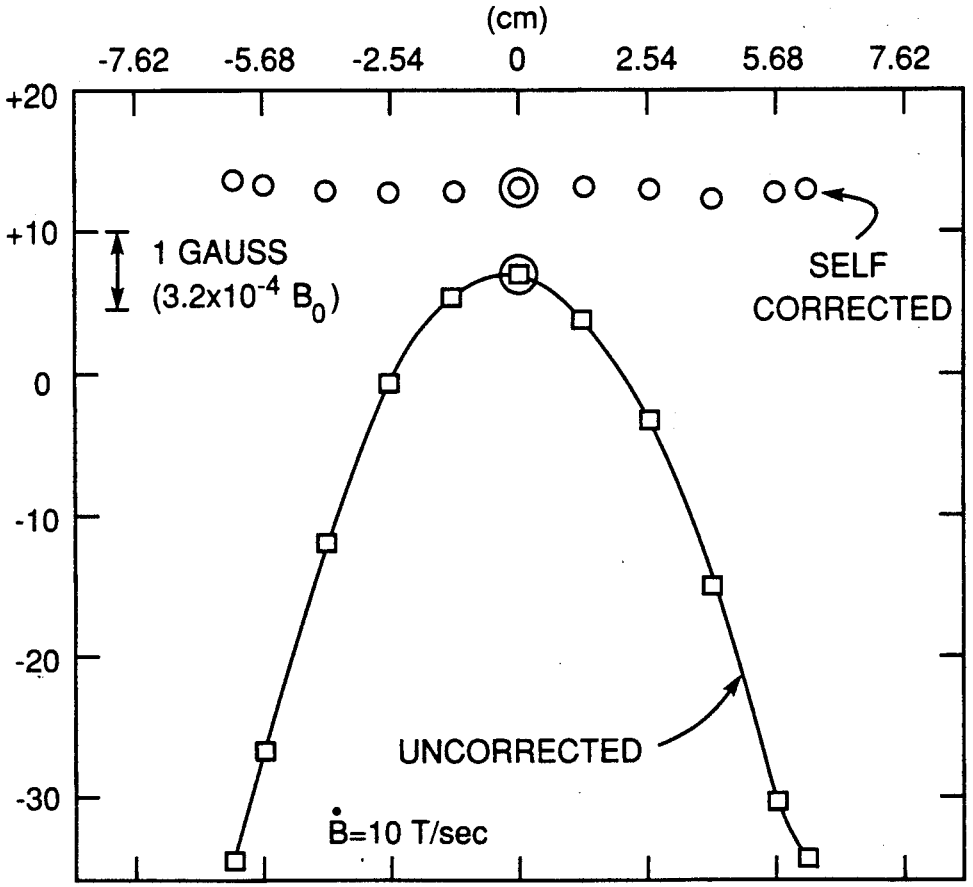
FIG. 4 is a graph that shows a large radial variation in eddy current on the horizontal mid-plane of a vacuum chamber such as that illustrated in FIG. 1, with the illustrated hyperbolic-like curve showing the vacuum chamber operated without the correction windings of the invention being energized, while the generally flat curve shows the results of operating the vacuum chamber with the self-correction windings being energized according to the method of the invention.

With the correction coils 3A-1 through 3A-3 and 3B-1 through 3B-3 mounted in predetermined positions that are determined either by computed theoretical analysis, or empirically by manually adjusting the positions on the upper and lower surfaces, respectively, of the vacuum chamber 1, the preferred embodiment of the invention was tested inside a Booster, with the dipole magnets pulsed with constant dB/dt of about 10 T/sec. during rise and fall cycling of the field. FIG. 4 illustrates the large radial variations thus obtained in eddy current fields, as measured as a function of position on the horizontal mid-plane of the vacuum chamber 1, which is depicted by the curve labeled "Uncorrected" in the drawing. With the switch 8 thrown to disconnect the (optional) power supply 7 and to form a series circuit with the secondary coils 4A and 5B, the variable resistor 6 and the correction windings 3A and 3B, the adjustable resistor 6 was set to cause a current of about 15.8 amps in the correction winding 3A and 3B. With the vacuum chamber magnetic flux B equal to 10 T/sec the essentially flat curve shown on the upper portion of FIG. 4 and labeled "self-corrected" was measured. Thus, since B/B max occurs at about 2500 gauss, the magnetic field is substantially flat to approximately $1\times10^{-4}$ everywhere across the beam line portion of the vacuum chamber 1, due to the self-correcting transformer action throughout the fast proton cycle.

Figure 5:
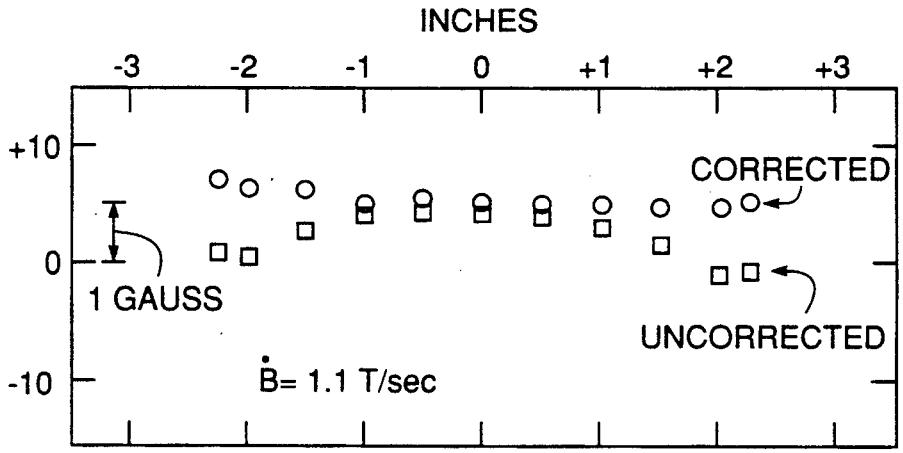
FIG. 5 is a graph showing a lower curve that plots variations in vacuum chamber magnetic flux as a function of distance from the central axis of the vacuum chamber, when the correction windings mounted on the chamber in accordance with the method of the invention are in their non-energized condition; and showing in an upper curve the effect of energizing the self-correction windings on the vacuum chamber, according to the method of the invention.

FIG. 5 contains the same type of information, but for a rise rate that is approximately 10 times lower than that used for the curve illustrated in FIG. 4. The 10 times smaller vacuum chamber eddy currents thus produced are still corrected, because the self-correction method of the present invention is independent of rise rate. For this further test, the setting of series resistance 6 was not changed. This feature of the method of the invention provides a great simplification to field control during proton acceleration, since the Booster vacuum chamber will have a complex excitation cycle, with large changes of B. As is seen in FIG. 5, the curve plot labeled "uncorrected" is shallower than the uncorrected curve illustrated in FIG. 4, but the plotted data labeled "corrected" is still approximately flat across the entire width of the vacuum chamber.

Figure 6:
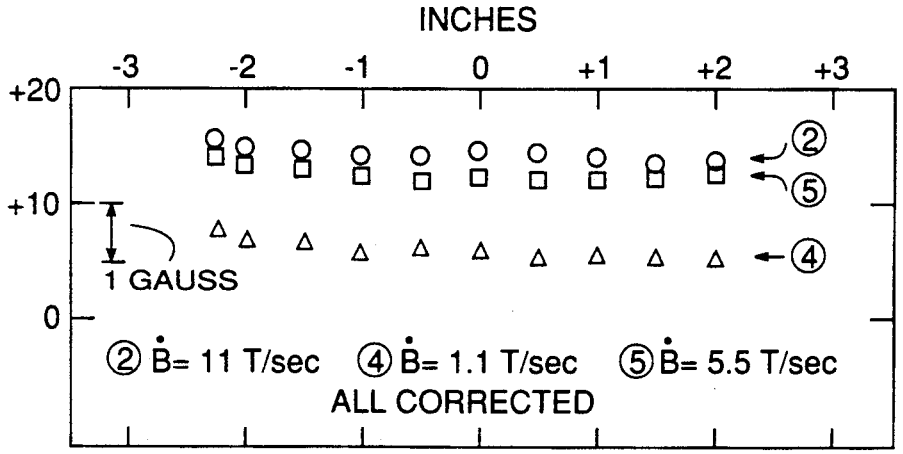
FIG. 6 is a graph containing three curves, each of which shows "self-corrected" magnetic field flux (as a function of distance from the central axis of the vacuum chamber), with the three curves being run for different rates of magnetic field rise within the vacuum chamber. These curves illustrate that the self-correction method of the invention is operable independent of field rate rise.

FIG. 6 shows the "self-corrected" magnetic field shape, as it was measured at three different rise rates within the vacuum chamber 1. For the upper most curve labeled "2", B=11 T/sec., for the next highest curve, labeled "5", B=5.5 T/sec., and for the lowermost curve, labeled "4", B=1.1 T/sec. From these data, it is clear that by self-correcting the vacuum chamber eddy currents with the method of the invention, the vacuum chamber eddy current field non-linearities are essentially cancelled or removed.

For the disclosed AGS Booster embodiment of the method of the invention, proton fast cycling injection occurs at about 0.16 T and ejection at about 0.56 T. dB/dt is only 1.4 T/sec. at injection, rising to about 8 T/sec. by 0.25 T, which occurs about 30 milliseconds later. Since the vacuum chamber time constant (t) is relatively short, i.e. t=0.35 milliseconds, the rate of change of dB/dt is adiabatic. The time constant of the vacuum chamber correction circuit is somewhat shorter than that of the vacuum chamber itself. However, the combined response is faster than that of the chamber alone. While that factor is not important in this preferred embodiment of the invention, for applying the invention with faster cycled accelerators, this could be helpful. In fact, by adding some inductance, the two time constants could be suitably matched, thereby providing yet another advantage to the "self-correction" method of the invention which uses transformer action to energize the correction windings.

With the simple correction method of the invention, the dipolar term of the vacuum chamber eddy current is only partially corrected. The dipoles and both quadrapole strings in a system such as that used at the AGS Booster accelerator, will all contain vacuum chambers. Transducers measure the fundamental components in all three of those subsystems. Eddy currents in the magnets and the vacuum chambers, as well as magnetization in the magnets contribute to those fundamental fields; i.e., to dipolar in dipoles and quadrupolar in quadrupoles. Servoing of power supplies controls the tracking or tune of the overall apparatus. The purpose of the "self-correction" of the method of the invention is to suppress sextupole and higher moment aberrations. However, it should be understood that the method of the invention could be readily extended for more elaborate corrector designs. In some such applications, printed circuit technology could be readily employed. Fast cycling machines can benefit, and for some intermediate frequency machines the method of the invention might extend the frequency range of aluminum vacuum chambers.

From the foregoing description of the preferred embodiment of the invention, it will be apparent to those skilled in the art that various further modifications and improvements may be made in the invention without departing from its true scope. Accordingly, it is our intention to define the limits of the invention in the following claims.

We claim:

1. A method of correcting undesired magnetic field aberrations that are produced by eddy currents induced in a metallic vacuum chamber of an accelerator by magnetic fields that are produced by energization of particle beam-positioning electro-magnets which are operably mounted adjacent to the vacuum chamber for confining electrically charged particles in stable orbits while the charged particles that enter and exit the vacuum chamber through apertures in its walls are driven by an rf accelerating field, comprising, (a) attaching correction windings to the outside surface of the vacuum chamber at predetermined locations thereon, (b) providing secondary coils for supplying electric power to said correction windings, and providing a variable resistor, (c) electrically connecting said secondary coils in series with the correction windings, with the variable resistor operably positioned in the series circuit between the secondary coils and the correction windings, (d) providing means for supplying electric power to the secondary coils as a function of a predetermined proportion of the electric power in a beam of charged particles that is accelerated through said vacuum chamber, so that as the electric power in the charged particle beam line varies, the electric power in the secondary coils varies proportionately and, (e) adjusting the variable resistor thereby to cause the resultant current in the correction windings to generate a magnetic flux that effectively cancels eddy current induced aberration flux fields that are induced in the vacuum chamber by the beam confining magnets while the charged particles are accelerated through the chamber.

2. A method as defined in claim 1 wherein said means for supplying electric power to the secondary coils comprises providing an external power supply that is operably connected to deliver electric power to the secondary coils.

3. A method as defined in claim 1 wherein said means for supplying electric power to the secondary coils comprises positioning the secondary coils in inductive relationship to one of the electro-magnets that is energized to confine charged particles within an orbit through the vacuum chamber, whereby electric current is induced by transformer action into said secondary coils in proportion to the particle accelerating flux driving the charged particles through the vacuum chamber in a path to which the particle beam is confined by the beam-positioning electro-magnets.

4. A method as defined in claim 1 including, after step c, (c-1) measuring the magnetic field flux B produced at the horizontal mid-plane of the vacuum chamber for a given rise rate of the particle accelerating magnetic flux, and comparing the field flux B with the eddy current induced magnetic flux, thereby to determine the appropriate adjustment of the variable resistor that is needed for effecting step (e) of the method.

5. A method as defined in claim 1 wherein the predetermined locations of the correction windings are ascertained empirically by temporarily securing the correction windings to various arbitrarily selected positions on the outer surfaces of the vacuum chamber, then energizing the correction windings to produce a current that essentially cancels the eddy current flux produced in the vacuum chamber walls when they are positioned at optimum locations, and then securing the correction windings in their optimum locations on the outer surfaces of the vacuum chamber.

6. A method as defined in claim 1 wherein the desired final locations of the correction windings are determined by computed theoretical analysis and then the windings are attached to the vacuum chamber outer walls in said final locations.

* * * * *